(12) United States Patent
Bryenton et al.

(10) Patent No.: US 6,826,184 B1
(45) Date of Patent: Nov. 30, 2004

(54) METHOD AND SYSTEM FOR MULTI-SERVICE CUT-THROUGH SWITCHING THROUGH A CONNECTION-ORIENTED NETWORK

(75) Inventors: Al L. Bryenton, Nepean (CA); Paul Beaubien, Nepean (CA); Mieczyslaw Surazski, Ottawa (CA); Diana Chapman, Nepean (CA); Pierre Cousineau, Nepean (CA); Fotis Xipolatakis, Nepean (CA); Bruce Buffam, Woodlawn (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/567,030

(22) Filed: May 8, 2000

Related U.S. Application Data (60) Provisional application No. 60/173,501, filed on Dec. 29, 1999.

(51) Int. Cl.[7] ............................................. H04L 12/28
(52) U.S. Cl. ........................... 370/395.1; 370/395.52; 370/395.21; 370/351; 370/395.2
(58) Field of Search ........................ 370/351–356, 370/395.5, 389, 392, 396, 397, 395.1, 395.2, 395.21, 395.3, 395.31, 395.52, 535, 410

(56) References Cited

U.S. PATENT DOCUMENTS

| | | | | |
|---|---|---|---|---|
| 6,084,956 A | * | 7/2000 | Turner et al. | 379/230 |
| 6,219,348 B1 | * | 4/2001 | Allen et al. | 370/354 |
| 6,222,843 B1 | * | 4/2001 | Mauger | 370/397 |
| 6,400,713 B1 | * | 6/2002 | Thomas et al. | 370/355 |
| 6,526,063 B1 | * | 2/2003 | St-Amand et al. | 370/395.5 |
| 6,600,749 B1 | * | 7/2003 | Hayball et al. | 370/400 |
| 6,611,531 B1 | * | 8/2003 | Chen et al. | 370/458 |

* cited by examiner

Primary Examiner—Ajit Patel
(74) Attorney, Agent, or Firm—Neil G. J. Mothew (57) ABSTRACT

Multiple connections between switches that share the same Quality of Service (QoS) requirements are multiplexed onto a single virtual connection or switched path. The switched path may be established using a known standard or proprietary protocol, or even without knowledge of the underlying protocol. Provisioning and management software provided on the switches create originating and destination end points. When the network operator provisions an end point, a switched path call setup request is made to a networking interface which establishes a connection using a selected routing system through the network having the provisioned characteristics, such as bandwidth and QoS, of the switched path.

11 Claims, 7 Drawing Sheets

FIG. 9

METHOD AND SYSTEM FOR MULTI-SERVICE CUT-THROUGH SWITCHING THROUGH A CONNECTION-ORIENTED NETWORK

Applicants claim the right of priority based on Provisional Patent Application No. 60/173,501, filed Dec. 29, 1999.

BACKGROUND OF THE INVENTION

The present invention relates to routing in connection-oriented networks, such as Asynchronous Transfer Mode (ATM) networks and proprietary Passport Path Oriented Routing Systems (PORS). More particularly, the present invention relates to mapping many connections with the same performance objectives onto a single connection, and transporting (also known as shunting) the data through the underlying network infrastructure.

In a conventional ATM-centric network providing end-to-end connectivity for users of data services or protocols such as Frame Relay or Internet Protocol (IP), the number of connections can become quite large. Thus, the management of such connections becomes increasingly complex, and scaleability of networks becomes problematic.

Performance is also an issue in such networks. If connection-oriented transport is used for services and protocols such as Frame Relay or IP, performance is affected adversely because each connection requires setup time as the route is often determined by software. Also, significant CPU resources at tandem switches are required as the Virtual Path Identifier/Virtual Channel Identifier (VPI/VCI) space becomes large. Additionally, if connectionless transport is used, performance and routing decisions at each hop in the connectionless network are affected by the additional need to segment and reassemble frames.

It is desirable, therefore, to provide a scheme for transporting data such as Frame Relay and IP traffic across an ATM-centric network that addresses the above performance and management issues. It is also desirable to provide such a scheme that is easy to provision. More specifically, it is desirable to provide such a scheme that reduces the number of connections in the network and utilizes high performance switching capabilities of the network.

SUMMARY OF THE INVENTION

This invention satisfies those desires by providing a mechanism for multiplexing multiple connections sharing the same performance objectives onto one virtual connection, and shunting the data through the underlying network infrastructure.

A system consistent with the present invention comprises a switch in a connection-oriented network for establishing a path through a network to a remote switch for a plurality of connections between the switch and the remote switch, the switch comprises an end point of the path; a networking interface comprises means for receiving a setup request from the end point; means for determining a route through the network for the path and means for transmitting a setup request to the remote switch via the network.

A method consistent with the present invention establishes a path through an connection-oriented network for a plurality of connections between a first and second switch in the network, each connection having a performance objective, by determining the route of the path over the network between the first and second switch using a routing protocol; establishing the path between the first and second switch; and multiplexing the ones of the connections having the same performance objective onto the path between the first and second switch.

Apparatus and networks are also provided for carrying out the methods consistent with the present invention.

The advantages accruing to the present invention are numerous. The present invention provides a high-performance, low-latency method for routing traffic across connection-oriented networks, such as ATM-centric networks. Methods consistent with the present invention eliminate the need for software routing on tandem switches. There is no need to go up the protocol routing stack at each hop. Advantageously, the present invention operates independently of the routing protocol and makes direct use of the underlying layer 2 forwarding.

The above desires, other desires, features, and advantages of the present invention will be readily appreciated by one of ordinary skill in the art from the following detailed description of the preferred implementations when taken in connection with the accompanying drawings.

DETAILED DESCRIPTION OF THE PREFERRED EMBODIMENTS

Figure 1:
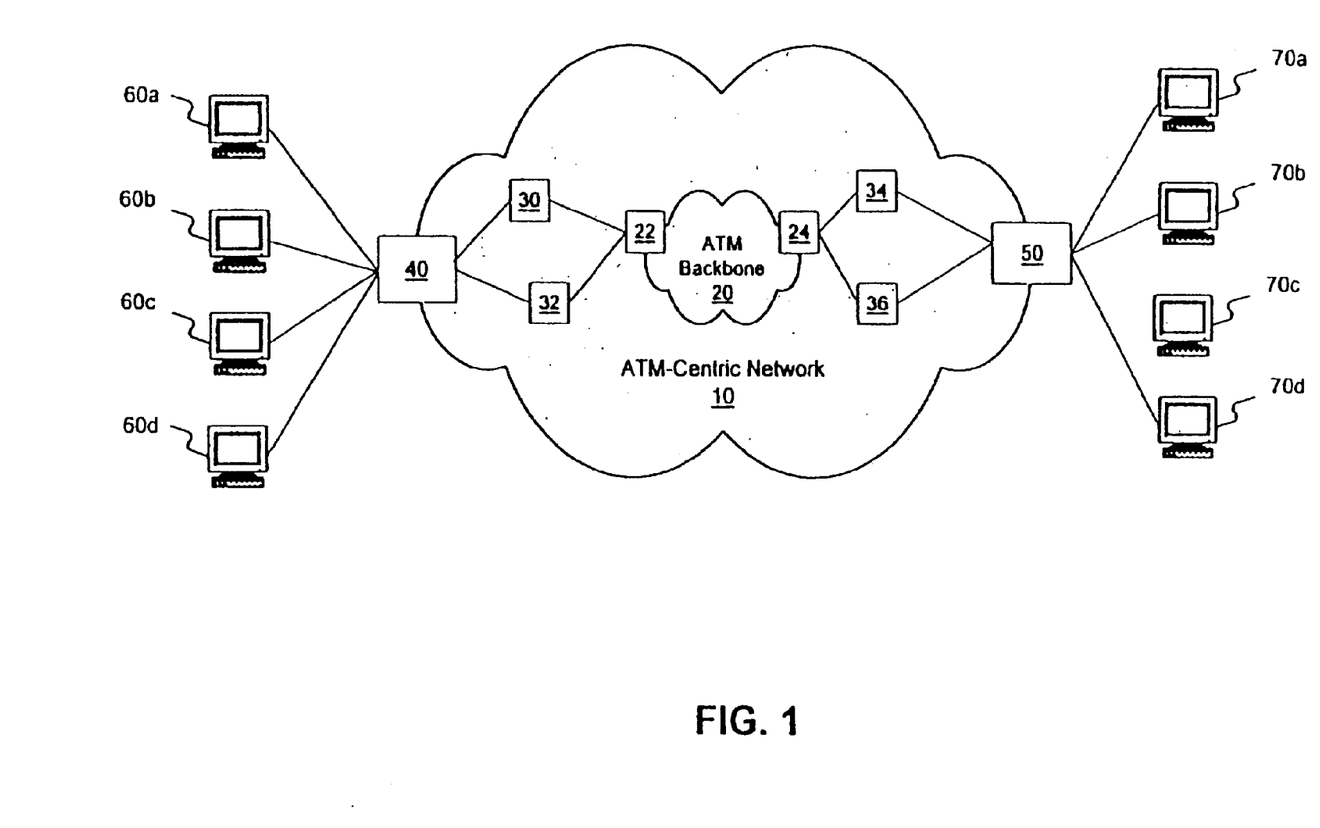
FIG. 1 is a high level diagram of an ATM-centric network in which multi-service cut-through switching consistent with the present invention may be implemented.

FIG. 1 is a high-level diagram of an ATM-centric network in which methods and systems consistent with the present invention may be implemented. ATM-centric network 10 includes ATM backbone network 20. ATM backbone 20 includes ATM switches and trunks (not shown) for transporting data according to ATM standards. ATM backbone 20 also includes switches 22 and 24, which interface with other switches shown as switches 30, 32, 34, and 36, that are part of ATM, frame relay, or mixed frame/cell networking environments. For example, if switches 30, 32, 34, and 36 are ATM switches, the trunks connecting them are ATM trunks. Switches 30, 32, 34, and 36 may have frame and/or cell switching capability, and the trunks connecting them can be frame, cell or combinations thereof (including hybrid frame/cell trunks). An example of a hybrid frame/cell trunk is Nortel Network's proprietary frame/cell trunk that allow frame or cell traffic to get transported between a Nortel Network's Passport switches. Such a trunk can be used to transmit variable-sized frames or fixed-sized cells. Frame traffic such as Frame Relay and/or IP traffic can be carried on both frame/cell trunks and ATM trunks as encapsulated data. At the edge of ATM-centric network 10 are switches 40 and 50, which interface to end devices (such as terminals or networks) which require access to ATM-centric network 10 for communication with other end devices. For example, terminals 60a, 60b, and 60c access ATM-centric network 10 through switch 40, and terminals 70a, 70b, and 70c access ATM-centric network 10 through switch 50. Terminals 60a, 60b, 60c, 70a, 70b, and 70c are users who require connection to other users and use a particular data communication protocol, such as frame relay or Internet Protocol (IP). Instead of end devices (such as terminals), another network (not shown), such as a Frame Relay or IP network and other equipment types such as routers or multiplexers, etc., may access ATM-centric network 10 through switch 40 or switch 50.

Figure 2:
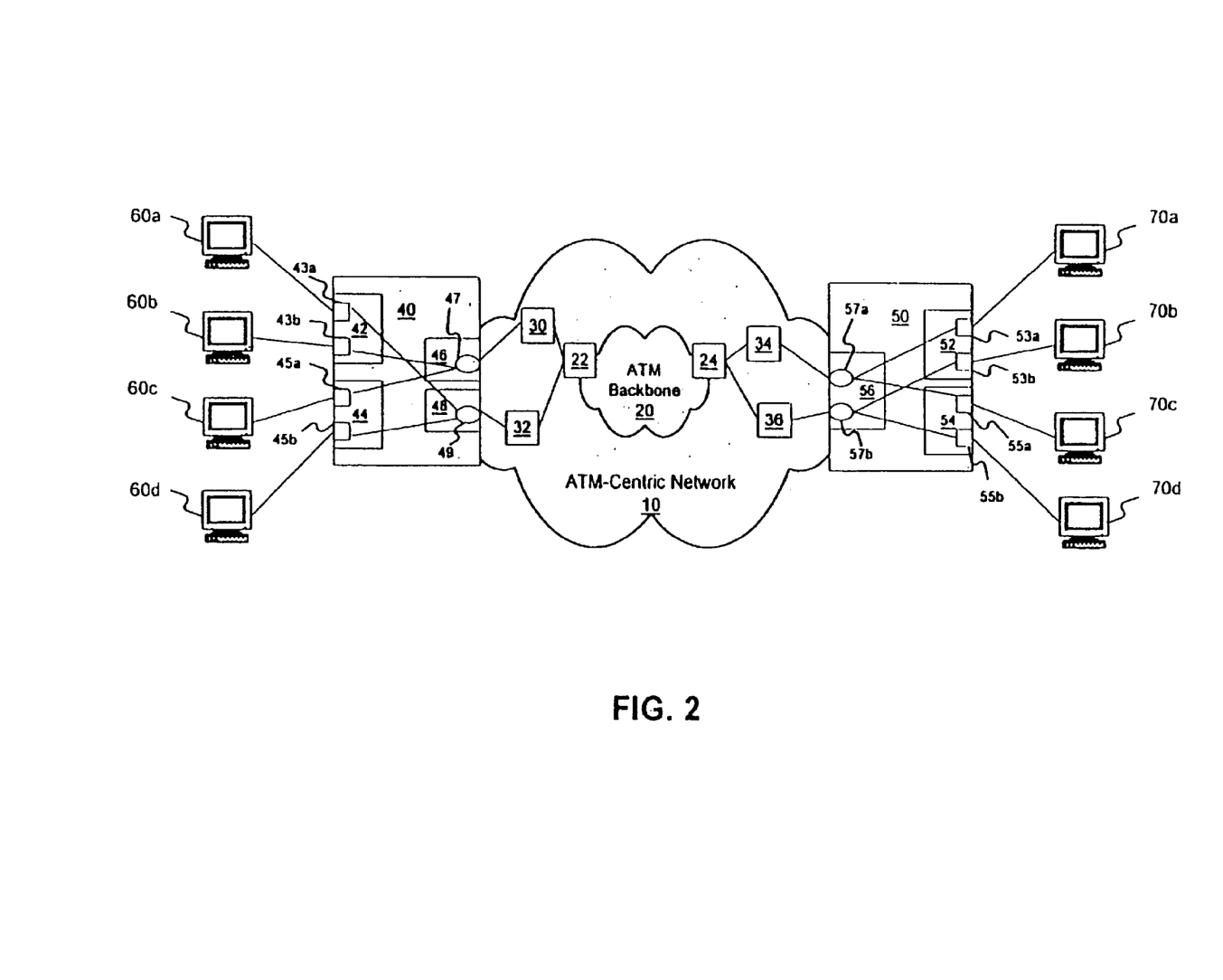
FIG. 2 is a high level diagram of an ATM-centric network consistent with the present invention, illustrating network switches in more detail.

FIG. 2 illustrates an ATM-centric network in which methods and systems consistent with the present invention may operate and shows switches 40 and 50 in more detail. Switch 40 includes one or more access interfaces—for example, access interfaces 42 and 44—which provide interfaces to terminals or networks requiring access to network 10—for example, terminals 60a, 60b, 60c, and 60d. Similarly, switch 50 includes access interfaces 52 and 54, which provide interfaces to terminals 70a, 70b, 70c, and 70d. Access interfaces 42, 44, 52, and 54 are preferably access cards and include one or more ports. As shown in FIG. 2, by way of example, access interface 42 includes ports 43a and 43b, access interface 44 includes ports 45a and 45b, access interface 52 includes ports 53a and 53b, and access interface 54 includes ports 55a and 55b.

Switch 40 also includes one or more transport interfaces—for example, transport interfaces 46 and 48—which provide interfaces to network 10. Similarly, switch 50 includes transport interface 56. Transport interfaces 46, 48, and 56 are also access cards and include one or more ports. By way of example, transport interface 46 includes port 47, transport interface 48 includes port 49, and transport interface 56 includes ports 57a and 57b.

In a conventional connection-oriented ATM-centric network, communication between terminal 60a and terminal 70a, for example, is implemented over a virtual connection between switch 40 and switch 50. A communication between terminal 60b and terminal 70b, for example, requires a separate virtual connection between switch 40 and switch 50. As each virtual connection is established separately, routing decisions have to be made at multiple switches in network 10. The management of connections becomes increasingly complex as the number of connections grows.

Figure 3:
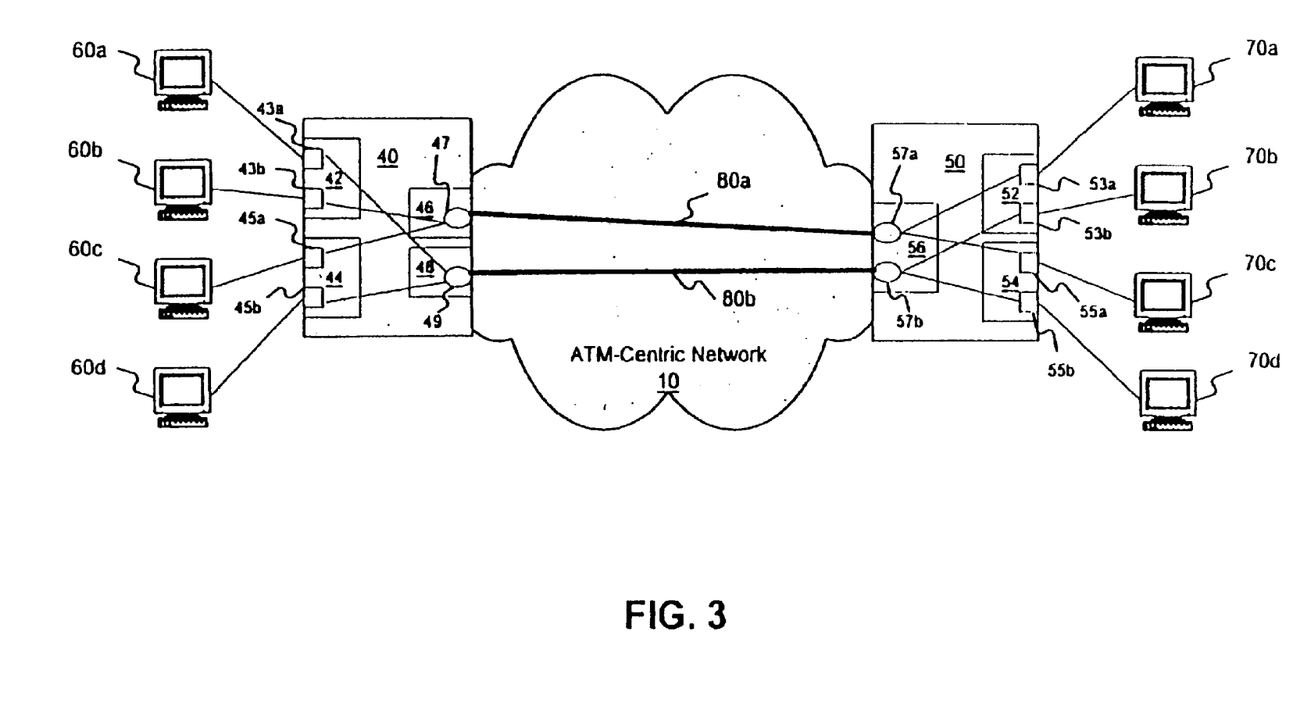
FIG. 3 illustrates, from a logical perspective, a switched path consistent with the present invention.

Consistent with the present invention, multiple connections between switch 40 and switch 50 that share the same Quality of Service (QoS) requirements are multiplexed onto a single virtual connection, referred to herein as a switched path, between switch 40 and switch 50. FIG. 3 illustrates, from a logical perspective, two switched paths—80a and 80b—between switches 40 and 50. Each switched path contains a many-to-one multiplexing of connections between switches 40 and 50. Connections from all points on each switch, not just from a single access interface, can be multiplexed onto one switched path, so long as they have the same QoS requirement. In FIG. 3, a connection from access interface 42 and a connection from access interface 44, both destined for switch 50 and having the same QoS requirement, are multiplexed onto switched path 80a at transport interface 46. Similarly, connections from interfaces 42 and 44, both destined for switch 50 and having the same QoS requirement, different from the QoS requirement on switched path 80a, are multiplexed onto switched path 80b at transport interface 48.

At switch 50, connections destined for switch 40 are similarly multiplexed onto switched paths 80a and 80b, depending on their required QoS. One connection from access interface 52 and one connection from access interface 54 are multiplexed onto switched path 80a via port 57a of transport interface 56. Another connection from access interface 52 and another connection from access interface 54 are multiplexed onto switched path 80b via port 57b of transport interface 56.

Figure 4:
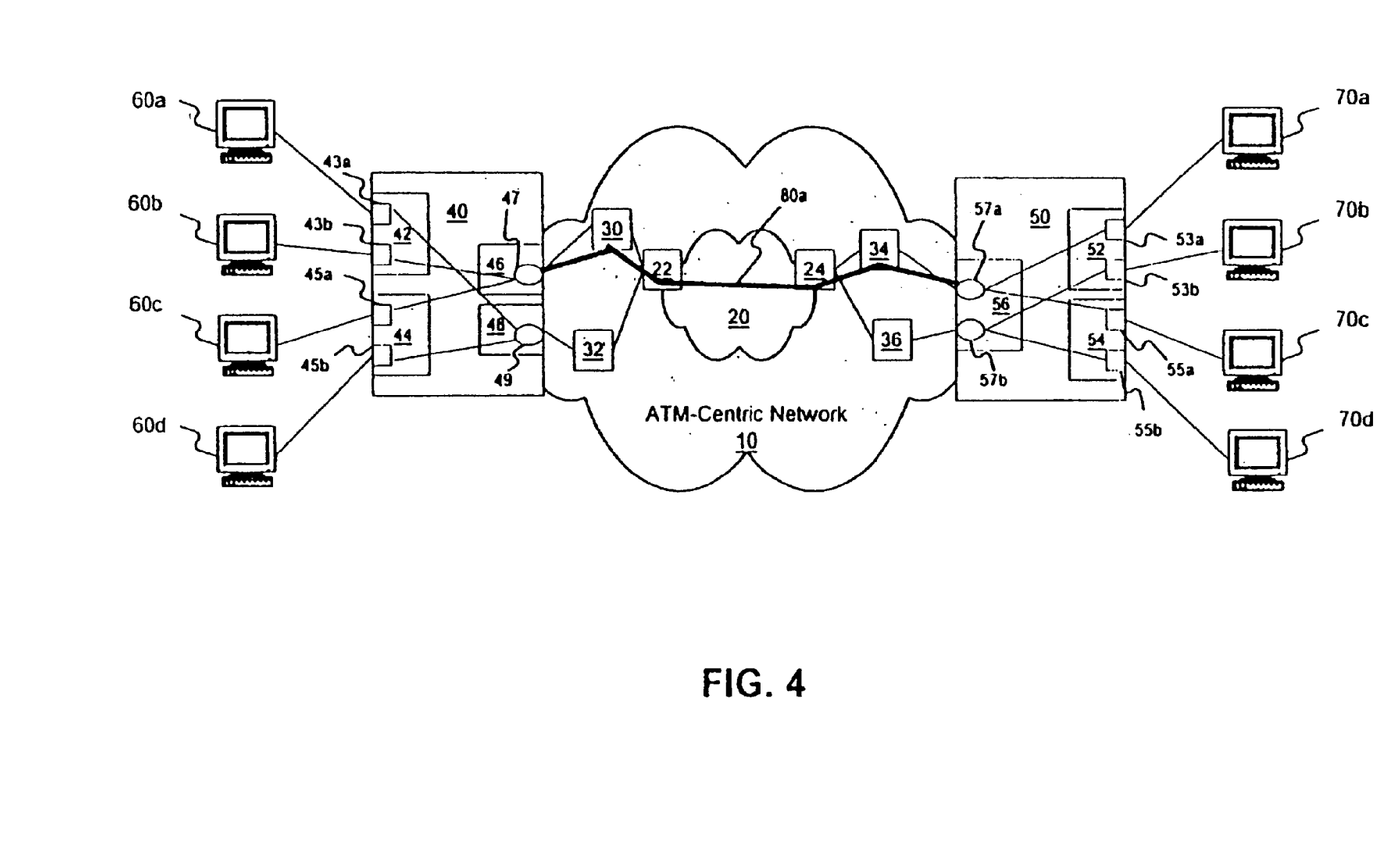
FIG. 4 illustrates, from a physical perspective, a switched path consistent with the present invention.

FIG. 4 illustrates a physical implementation of a switched path consistent with the present invention. When a switched path is established, as will be described in more detail below, the route is determined using a standard or proprietary routing protocol. For example, if network 10 consists only of ATM switches and ATM trunks, an ATM standard routing protocol such as Interim Interswitch Signaling Protocol (IISP) or Private Network-to-Network Interface (PNNI). Alternatively, a proprietary connection-oriented routing protocol, such as Nortel's Path Oriented Routing System (PORS), can be used to establish the route of the switched path through an ATM network, frame/cell network, or combination ATM and frame/cell network. Methods and systems consistent with the present invention may establish a switched path without knowledge of the underlying routing protocol. In FIG. 4, the route established for switched path 80a goes from switch 40 to switch 50 via switches 30, 22, any intermediate switches in ATM network 20 (not shown), and switches 24 and 34.

Consistent with the present invention, switched paths are implemented by provisioning and management software on switches 40 and 50. A switched path consists of two end points, each end point residing in a switch. For example, switched path 80a in FIG. 4 has an end point in switch 40 and an end point in switch 50. Consistent with the present invention, an end point is either an originating end point, created when a network operator provisions switched path software on a switch, or a destination end point, created dynamically when a switch receives a call setup request from an originating end point. End points that share a common destination are grouped together in an end point group. Each end point group contains a component specifying the remote Network Service Access Point (NSAP) address identifying the destination switch that contains the destination end point for all originating end points in the group.

During provisioning of an originating end point, the network operator can select the routing system, or sequence of routing systems, that the end point will use to establish a switched path. For example, if selecting between a variety of routing systems, such as between ATM IISP and PORS is available, the network operator can choose ATM Only, PORS Only, ATM First (which attempts to use ATM routing, and then attempts to use PORS routing if ATM routing is unavailable), and PORS First.

In addition to default network class of service determination, the network operator may also provision the service class (for example, for ATM service class, Constant Bit Rate (CBR), Real Time Variable Bit Rate (VBR-rt), Non-Real Time Variable Bit Rate (VBR-nrt), or Unspecified Bit Rate (UBR) are available) that is used to establish the switched path between end points. This may be done indirectly based on the QoS parameters of the connections to be multiplexed onto the switched path. For example, if Frame Relay connections are going to be multiplexed onto the switched path, the network operator may specify the transfer priority of a Frame Relay connection, and software in the switch converts the transfer priority into an ATM class of service.

Consistent with the present invention, the network operator also provisions the QoS values that are supported through the switched path. In the example of Frame Relay connections, the network operator specifies which transfer priorities are supported on the switched path to be established from the originating end point.

The network operator also specifies the reserved bandwidth for switched path from an originating end point, often in bits/second. When the connection is established over the ATM network, the bandwidth is converted into a peak cell rate (PCR) according to PCR=Bandwidth/(48 bytes/cell*8 bits/byte).

Figure 5:
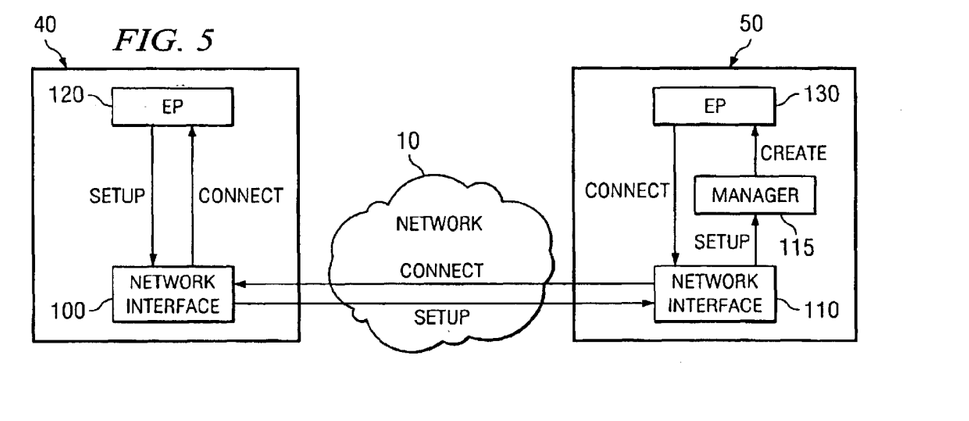
FIG. 5 illustrates a method and system for establishing a switched path consistent with the present invention.

FIGS. 5–7B illustrate methods for establishing and releasing switched paths consistent with the present invention. In FIGS. 5–7B, network interfaces 100 and 110 refer to networking software in switches 40 and 50 that communicates with network 10 and uses the selected routing system and protocol to establish the route for a switched path between switches 40 and 50. FIG. 5 is an illustration of a method for establishing a switched path consistent with the present invention. When the network operator provisions end point 120 on switch 40, end point 110 originates a switched path call setup request to networking interface 100, which established a connection using the selected routing system through the network based on the provisioned characteristics (e.g., bandwidth, class of service, supported QoS) of the switched path. Networking interface 110 on switch 50 receives the setup request and forwards it to manager 115. If there is no existing end point group on switch 50 corresponding to switch 40, manager 115 creates one. Otherwise, the existing end point group is used. Manager 115 (described in more detail below) creates dynamic end point 130, which returns a connect message to end point 120 via networking interfaces 100 and 110. The switched path is now available to transport data on connections between switch 40 and switch 50 meeting the QoS supported by the switched path.

Figure 6A:
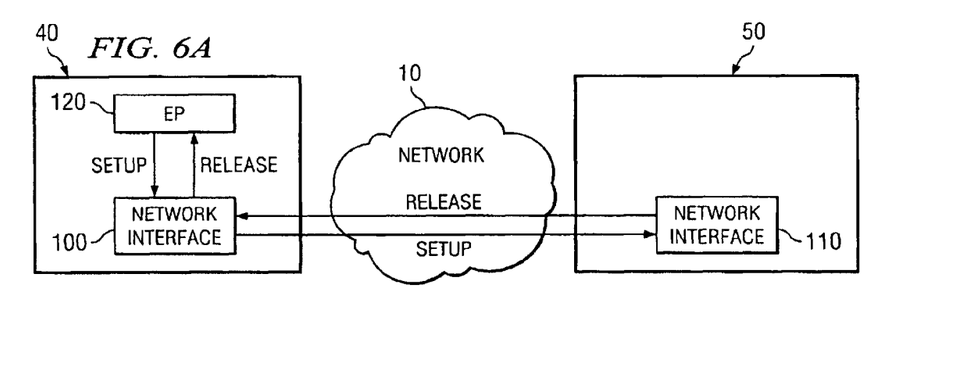
FIGS. 6A–B illustrate unsuccessful establishment of a switched path consistent with the present invention.
Figure 6B:
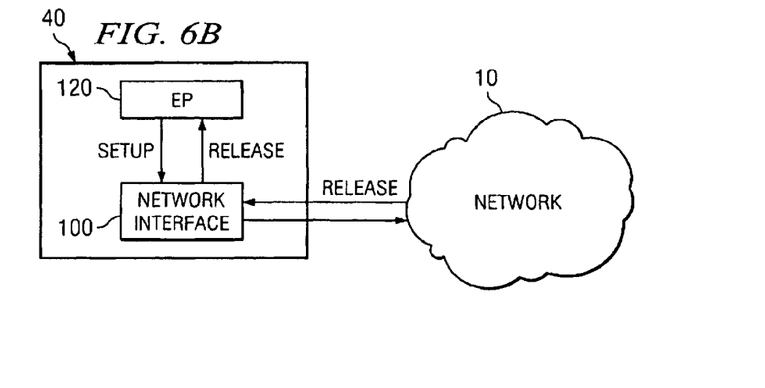

FIGS. 6A–B illustrate an unsuccessful switched path establishment. In FIG. 6A, upon receiving a setup request from end point 120 on switch 40, networking interface 110 in switch 50 returns a release to end point 120 through networking interface 100. The call can be released for many reasons, including the unavailability of resources on switch 50, invalid parameters, and the fact that switch 50 is not ready to accept setup requests. In FIG. 6B, network 10 sends a release because, for example, there are not enough network resources available.

Figure 7A:
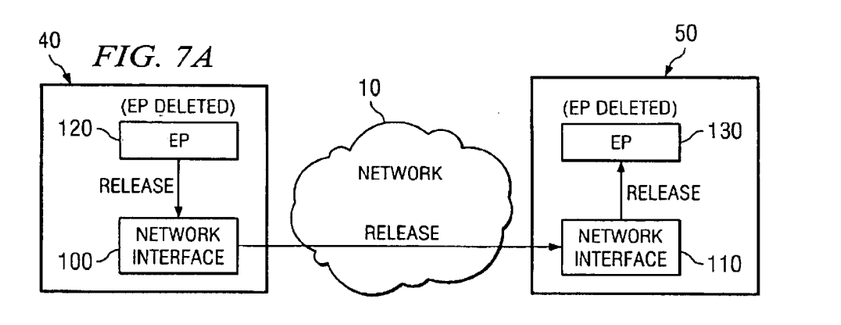
FIGS. 7A–B illustrate methods and systems for releasing a switched path consistent with the present invention.
Figure 7B:
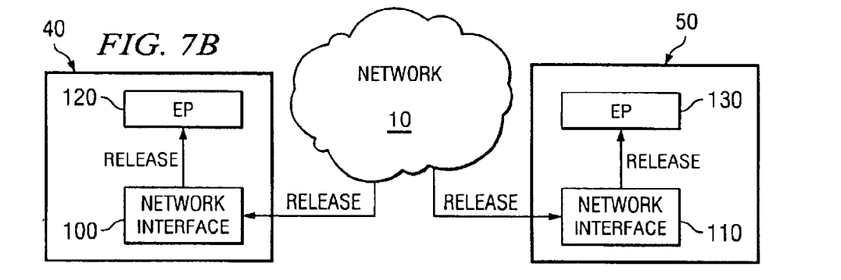

FIGS. 7A–B illustrate the release of a switched path. In FIG. 7A, a network operator deletes existing end point 120 on switch 40 due to a provisioning change. A release is sent via networking interface 100 to networking interface 110 in switch 50, and the connection is released, deleting end point 130. Furthermore, if end point 130 was the last end point in its end point group, the end point group is also deleted. FIG. 7B illustrates a release of a switched path due to a network failure. The network sends a release message to both the originating and the terminating ends of the switched path. End point 130 is released and deleted, and end point 120 proceeds to launch another setup request as shown in FIG. 5.

Figure 8:
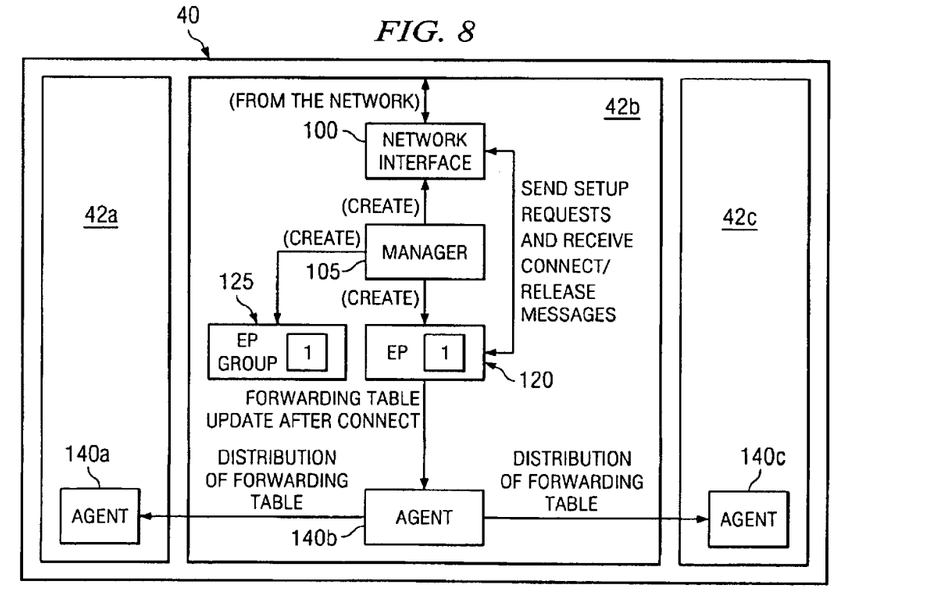
FIG. 8 illustrates a method and system for establishing an originating end point of a switched path consistent with the present invention.
Figure 9:
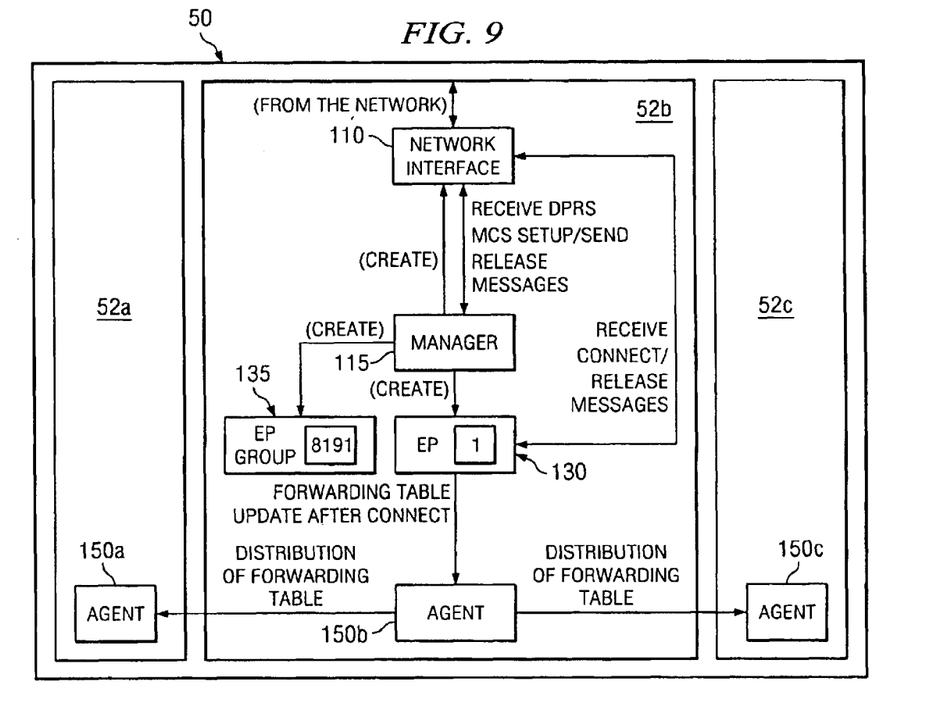
FIG. 9 illustrates a method and system for establishing a destination end point of a switched path consistent with the present invention.

FIGS. 8 and 9 illustrate functional software components in switches 40 and 50 for creating end points and for sending call setup requests. FIG. 8 illustrates the creation of an originating end point in switch 40. When the network operator provisions the switched path software on switch 40, manager 105 is automatically created on one of the access interfaces, e.g., access interface 42b in FIG. 8. Manager 105 creates networking interface 100, end points (e.g., end point 120), and end point groups (e.g., end point group 125). End point 120 then sends a setup request through networking interface 100 and waits for either a connect or a release message from networking interface 100. When using ATM transport network, the setup request message is in the form of an ATM UNI Setup PDU. If a release message is received, end point 120 will back off for a given period and then retry the setup request. If a connect message is received, end point 120 stages with the remote end point on switch 50 and updates a forwarding table in agent 140b with forwarding information, which agent 140b will use to forward data arriving at access interfaces on switch 40 to the appropriate transport interface and port. Agent 140b also distributes the forwarding information to agents 140a and 140c, on access interfaces 42a and 42c, respectively.

Similarly, for other transport network types, analogous setup, release, etc. messages that correspond to that specific network type may be used.

FIG. 9 illustrates the establishment of a dynamically created destination end point in switch 50. Manager 115, already existing on access interface 52b, receives a call setup request from switch 40 through network interface 110. If security requirements are not met or there are insufficient local resources, manager 115 releases the call. If the call request is accepted, manager 115 creates end point group 135 and end point 130. At this point, call setup control is passed to end point 130. End point 130 sends a connect if it can accept the request, or otherwise sends a release and deletes itself. If the call is accepted, end point 130 updates a forwarding tabled in agent 150b with forwarding information. Agent 150b in turn distributes the forwarding information to agents 150a and 150c on access interfaces 52a and 52c, respectively.

It will be appreciated by those skilled in this art that various modifications and variations can be made to the multi-service cut-through switching scheme consistent with the present invention described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A method for establishing a switched path through a connection-oriented network for carrying on the switched path a plurality of connections between a first switch in the network and a second switch in the network, each connection having a performance objective, the method comprising the steps of:

determining a route of the switched path between the first switch and the second switch over the network using a routing protocol;

establishing the switched path between the first switch and the second switch; and multiplexing at least two of the plurality of connections having the same performance objective onto the switched path between the first switch and the second switch.

2. The method of claim 1, wherein the first switch includes a plurality of access interfaces, wherein each connection transports traffic between one of the plurality of access interfaces on the first switch and the second switch, and wherein the multiplexing step includes the substep of multiplexing connections from the plurality of access interfaces within the first switch.

3. A switch in a connection-oriented network for establishing a switched path through the network to a remote switch for a plurality of connections between the switch and the remote switch, the switch comprising:

an end point of the switched path;

a networking interface comprising,
   means for receiving a setup request from the end point,
   means for determining a route through the network for the switched path, and
   means for transmitting a setup request to the remote switch via the network; and means for multiplexing the plurality of connections onto the switched path, and wherein a performance objective of each of the multiplexed plurality of connections is the same.

4. The switch of claim 3, wherein the networking interface further comprises:

means for receiving a connect message from the remote switch.

5. The switch of claim 3, wherein the networking interface further comprises:

means for receiving a release message from the network.

6. The switch of claim 3, wherein the networking interface further comprises:

an end point manager for creating and deleting end points.

7. The switch of claim 4, wherein each switch includes access interface means.

8. The switch of claim 4, wherein:

the end point includes a forwarding table;

said forwarding table being updated after said connect message is received from the remote switch.

9. The switch of claim 8, wherein:

each of said interface means includes an agent.

10. The switch of claim 9, wherein:

said updated forwarding table is distributed to each agent.

11. The method of claim 1 further comprising:

determining a route of a second switched path between the first switch and the second switch over the network using a routing protocol;

establishing the second switched path between the first switch and the second switch; and establishing at least one connection over the second switched path, the at least one connection having a different performance objective than the at least two plurality of connections multiplexed onto the switch path.

* * * * *